Patented Jan. 8, 1946

2,392,595

UNITED STATES PATENT OFFICE 2,392,595

METHODS OF PREPARING α,β-DIARYL ETHANES

Morris S. Kharasch, Chicago, Ill., assignor to Eli Lilly and Company, Indianapolis, Ind., a corporation of Indiana No Drawing. Application December 26, 1941, Serial No. 424,499

16 Claims. (Cl. 260—613)

This invention relates to the preparation of α,β-diaryl ethanes.

Certain α,β-diaryl ethanes possess marked estrogenic properties. For example, 3,4-di-(p-hydroxyphenyl) hexane has been found to be an extremely potent estrogen. The methods heretofore employed for producing 3,4-di-(p-hydroxyphenyl) hexane and the 3,4-dialkoxyphenyl hexane from which the 3,4-di-(p-hydroxyphenyl) hexane was usually prepared were fraught with difficulty, involved material expense, and resulted in low yields.

In accordance with this invention, α,β-diaryl ethanes and more particularly 3,4-di-(p-alkoxyphenyl) hexanes are prepared efficiently and economically.

The diaryl ethanes which are prepared in accordance with this invention are represented by the following formula:

(1) 

in which R is an aryl group which may have one or more alkoxy substituents but which otherwise has no other nonhydrocarbon substituent; $R_1$ is a member selected from the class which consists of hydrocarbon radicals and hydrogen and $R_2$ is a member selected from the class which consists of hydrocarbon radicals and hydrogen.

More particularly, the 3,4-di-(p-alkoxyphenyl) hexanes represented by the following formula are produced by the method of this invention:

(2) 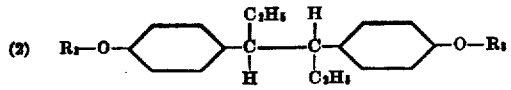

in which $R_3$ is a lower-alkyl group, such as the methyl, ethyl, propyl, or isobutyl radicals.

The method in accordance with this invention is as follows:

A composition having the formula:

(3) 

in which X is a halogen, such as bromine or chlorine, is reacted with the reaction product of a Grignard's reagent and a small quantity of an anhydrous halide of a metal of the VIII periodic group, 4th series; namely, iron, cobalt, or nickel. When the metal in the halide is divalent, the reaction which takes place is believed to be represented by the following:

(4) 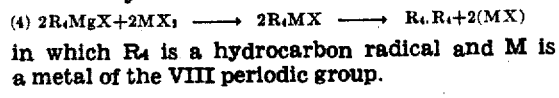

in which $R_4$ is a hydrocarbon radical and M is a metal of the VIII periodic group.

(5) 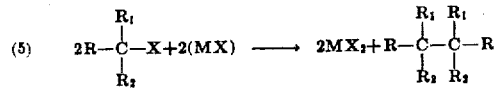

It is believed that a submetallic halide is formed during the reaction of the Grignard's reagent with the metallic halide, and that that submetallic halide reacts with the composition represented structurally in Formula 3. The reaction product of the Grignard's reagent and the metallic halide, when the metal in the metallic halide is divalent, substantially regenerates itself. For that reason it is desirable to employ metallic halides in which the metal is divalent rather than those in which the metal is trivalent, and to use a relatively small quantity of the metallic halide. The quantity of the metallic halide to be used is preferably up to 15 mole percent of the Grignard's reagent, and is more desirably from 2 to 6 mole percent.

The composition represented structurally in Formula 3 is preferably reacted with a reaction product prepared from one to two molecular equivalents of a Grignard's reagent and two to six mole percent of a metallic halide having a divalent metal of the VIII periodic group, for example cobaltous, nickelous, or ferrous chloride or bromide.

In the preparation of the reaction product, the Grignard's reagent is desirably dissolved in an inert anhydrous solvent, such as ethyl ether. The solution of the Grignard's reagent is cooled in a bath to a temperature of about −20° to −10° C. and, while vigorously agitating the solution, adding the halide of the metal of the VIII periodic group. The reaction product is formed within a relatively short period of time and to the reaction mixture is added over a period of from one half to one hour in small portions the composition represented structurally in Formula 3. The reaction mixture during the addition may be maintained at the low temperature (−10° to −20° C.) or gradually permitted to rise toward room temperature (15° to 20° C.). It is preferred to add the composition represented structurally in Formula 3 to the reaction product of the Grignard's reagent and the metallic halide rather than add the reaction product to the composition.

After the composition represented structurally in Formula 3 has been added, the reaction mixture is permitted to rise to room temperature and the reaction mixture is agitated for several hours.

Decomposition of the reaction mixture is effected by pouring the mixture into ice and a nonoxidizing mineral acid, such as hydrochloric acid. The desired product, represented structurally by Formula 1, may be separated from other components of the reaction mixture by any convenient means. The reaction mixture separates into two layers—an organic solvent layer and a water solution. The organic solvent layer contains substantially all of the composition represented in Formula 1 in the mixture. It then may be recovered from the organic solvent layer by any convenient means, such as distillation of the solvent and subsequent recrystallization if the composition is crystalline.

The composition represented structurally by Formula 3 may be prepared when $R_1$ is an alkyl group by reacting the required halogen halide with a composition having the following formula:

(6) 

in which $R_5$ is an alkyl group. Preferably, the composition represented structurally by Formula 6 is dissolved in a suitable solvent, such as toluene, and is maintained at a temperature below $-20°$ C. Dry hydrogen halide, such as hydrogen bromide or hydrogen chloride, is passed through the composition. After it no longer absorbs the hydrogen halide, the temperature of the mixture is permitted to rise and the excess of the hydrogen halide is substantially removed by displacing the hydrogen halide with an inert gas, such as carbon dioxide. This displacement is conveniently achieved by bubbling the inert gas through the reaction mixture.

The reaction which takes place in the formation of the composition represented structurally in Formula 3 is represented by the following equation:

(7) 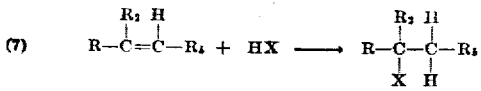

The resulting reaction mixture may be used directly without isolation of the composition represented structurally by Formula 3 to react with the reaction product of the Grignard's reagent and the halide of the metal of the VIII periodic group.

Examples of R are: phenyl, p-methoxyphenyl, o-methoxyphenyl, β-naphthyl, and o-tolyl. Examples of $R_1$ and $R_2$ are: alkyl radicals, such as methyl, ethyl, and aryl radicals, such as phenyl and tolyl. Examples of $R_4$ are: aryl radicals, such as phenyl and tolyl, and alkyl radicals, such as ethyl and methyl, and alkenyl radicals, such as allyl. Examples of $R_5$ are: ethyl, methyl, and propyl.

This invention is particularly directed to the preparation of 3,4-di-(p-dialkoxyphenyl) hexane represented structurally by Formula 2. Such compositions are readily prepared by first producing a 1-(p-alkoxyphenyl)-1-halopropane. The 1-(p-alkoxyphenyl)-1-halopropane is formed by causing the 1-p-alkoxyphenylpropene-1 to absorb a molecular equivalent of a hydrogen halide, such as hydrogen bromide. The reaction is preferably conducted at relatively low temperatures ($-20°$ to $-10°$ C.) and the 1-p-alkoxyphenylpropene-1 may be dissolved in a suitable solvent, such as toluene. The excess hydrogen halide is removed by bubbling an inert gas, such as carbon dioxide, through the reaction mixture. After the reaction mixture is substantially free of the hydrogen halide, it is preferably diluted with an anhydrous inert solvent, such as absolute ethyl ether. Desirably, the reaction mixture is maintained at a low temperature (about $-20°$ C.) until used.

About one and a half molecular equivalents of a Grignard's reagent, such as phenyl magnesium bromide in ether, is maintained at $-20°$ to $-10°$ C. and to that solution is added, while vigorously stirring, up to 15 mol percent of an anhydrous halide of a metal of the VIII periodic group. Desirably, the halide is cobaltous, nickelous, or ferrous bromide or chloride. While maintaining the reaction product at the low temperature ($-20°$ to $10°$ C.), the solution of the 1-(p-alkoxyphenyl)-1-halopropane is added to the mixture in small portions over a period of about half an hour. The reaction mixture is then permitted to rise to room temperature ($15°$ to $20°$ C.) and agitated for several hours.

The mixture is poured on ice, mixed with a small amount of a nonoxidizing mineral acid, such as hydrochloric acid. An organic solvent layer and a water layer separate. The solvent also contains the major portion of the desired 3,4-dialkoxyphenyl hexane. To obtain the small quantity of the desired product in the water layer, that layer is extracted several times with a suitable solvent, such as benzene. The extracts are combined, added to the organic solvent layer, the whole dried, and the solvent removed by distillation. The residue after distillation is purified by any suitable means, such as recrystallization. The 3,4-di-(p-hydroxyphenyl) hexane may be produced from the 3,4-di-(p-alkoxyphenyl) hexane by several well-known methods.

Typical examples of the method of this invention are as follows:

*Example 1.—Preparation of 3,4-di-(p-methoxyphenyl) hexane*

Fourteen and eight tenths grams of 1-p-methoxyphenylpropene-1 is diluted with 2½ times its volume of dry toluene and caused to absorb 8.1 g. of dry hydrogen bromide (0.1 mole) while cooled in a bath of solid carbon dioxide and acetone. During this time 1-p-methoxyphenyl-1-bromopropane is formed. The mixture is then permitted to rise to $0°$ C. as a stream of dry carbon dioxide is bubbled through it to displace any excess hydrogen bromide and is finally degassed at this temperature by evacuation on a water pump. The solution of 1-p-methoxyphenyl-1-bromopropane thus obtained is diluted with an equal volume of absolute ethyl ether, immediately cooled again and kept in the solid carbon dioxide-acetone bath.

To 65 cc. of 2.3 M phenyl-magnesium bromide solution in ether (0.15 mole), cooled in a bath at $-20°$ to $-10°$ C. and vigorously stirred, is added 1.0 g. of anhydrous cobaltous chloride (5 mole percent). The mixture assumes a brownish-black color. The 1-p-methoxyphenyl-1-bromopropane solution (0.1 mole) is added in small portions over a period of one-half hour, during which time the reaction mixture is still cooled at $-20°$ to $-10°$ C. The mixture is allowed to warm up to room temperature and the stirring is continued for 18 hours (overnight).

At the end of this time, decomposition of the reaction mixture is effected by pouring over about 300 g. of ice and 10 cc. of concentrated hydrochloric acid. After separating the organic solvent layer, the aqueous solution is extracted twice with benzene and the extracts are combined with the organic solvent layer fraction. After drying the combined organic solvent layer and extracts, the solvents are removed by distillation and the residue, a greenish-black oil which solidifies on cooling, is recrystallized from methyl alcohol. An excellent percentage yield is obtained. On recrystallization from ethyl alcohol a material which comprises 3,4-di-(p-methoxyphenyl) hexane is obtained. It melts sharply at 142° C. and shows no depression in mixed melting points with a known sample.

The residue from the reaction mixture yields 6.0 g. of biphenyl, M. P. 68°–69° C., and a high-boiling oil, the main constituents of which are probably polymers of 1-p-methoxyphenyl propene-1. The amount of biphenyl corresponds very nearly to 60 percent conversion of the Grignard's reagent to biphenyl.

*Example 2.—Preparation of 3,4-di-(p-methoxyphenyl) hexane*

The procedure described in Example 1 is repeated, using 15 mole percent cobaltous chloride instead of 5 mole percent, adding one-third of the cobaltous chloride at the beginning of the reaction and the remainder in small portions continuously during the addition of the 1-p-methoxyphenyl - 1 - bromopropane solution. Upon working up the reaction mixture, a lower yield of the desired 3,4-di-(p-methoxyphenyl) hexane is obtained; the yield is approximately 4.0 g., or 27.4 percent of the theoretical.

*Example 3.—Preparation of 3,4-di-(p-methoxyphenyl) hexane*

The procedure described in Example 1 is repeated except that an equivalent quantity of methylmagnesium bromide is used instead of phenylmagnesium bromide. The yield of crude 3,4-di-(p-methoxyphenyl) hexane is 5.2 g., or 35.6 percent of the theoretical. The residue from the reaction comprises a brown, viscous, high-boiling oil.

*Example 4.—Preparation of 3,4-di-(p-methoxyphenyl) hexane*

The procedure described in Example 1 is repeated except that 1 g. (5 mole percent) of anhydrous nickel chloride is used as the catalyst instead of the cobaltous chloride and is added gradually during the course of the reaction. Upon working up the reaction mixture, about 2.1 g. of pure 3,4-di-(p-methoxyphenyl) hexane (14.4 percent yield) is obtained.

*Example 5.—Preparation of 3,4-di-(p-methoxyphenyl) hexane*

The procedure described in Example 1 is repeated except that 0.8 g. of anhydrous ferric chloride (5 mole percent) is used instead of cobaltous chloride. The ferric chloride is added at the beginning of the reaction owing to its tendency to become sticky in the presence of the ether vapor. The yield of 3,3-di-(p-methoxyphenyl) hexane is 4.3 g. or 30 percent of the theoretical.

*Example 6.—Preparation of tetraphenyl ethane*

To a cooled solution of .1 mole of diphenylmethyl chloride dissolved in three times its volume of dry ether is added dropwise a mixture of .1 mole of phenylmagnesium bromide containing 3 to 5 mole percent of cobaltous chloride. During the addition the reaction mixture is stirred vigorously. At the completion of the reaction, the reaction mixture is heated for one hour and then worked up in the manner described in Example 1. A yield of 40 to 50 percent of tetraphenyl ethane is obtained.

The cobaltous halide may be added to the solution of the diphenylmethyl chloride and the Grignard's reagent added to this mixture. Other variations of adding the ingredients are also permissible, although considerable variations in yield may result.

*Example 7.—Preparation of hexaphenyl ethane*

The procedure described in Example 6 is repeated except that triphenylmethyl chloride is employed instead of diphenylmethyl chloride. To identify the resulting hexaphenyl ethane, oxygen is bubbled through the reaction mixture and the resulting triphenylmethyl peroxide is isolated.

*Example 8.—Preparation of 2,3-di-β-naphthyl butane*

The procedure described in Example 6 is repeated except that 1-β-naphthyl-1-chloro ethane is used instead of diphenylmethyl chloride. The resulting product, 2,3-di-β-naphthyl butane is represented by the following formula:

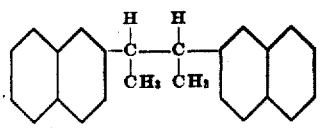

In the examples, the Grignard's reagents are aryl or alkyl magnesium bromides. Other Grignard's reagents, such as aryl or alkyl magnesium chlorides, may be used instead of the corresponding bromide, but the alkyl or aryl magnesium bromide is preferred. Likewise, for convenience, the alkyl magnesium halide employed is methyl and the aryl magnesium halide is phenyl. Other alkyl and aryl magnesium halides, such as propyl magnesium halide or tolyl magnesium halide, may be employed.

The subject matter of this application is within the broad disclosure of my copending application Serial No. 406,199.

What is claimed is:

1. The method of preparing an α,β-diaryl ethane having the formula:

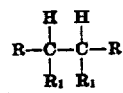

in which R is an aryl radical which contains at least one alkoxy substituent, but which otherwise has no other nonhydrocarbon substituent, and $R_1$ is a hydrocarbon radical, said method comprising reacting a halide of a metal of the class consisting of iron, cobalt, and nickel with a Grignard reagent of the class consisting of alkyl-magnesium halides and aryl-magnesium halides, and reacting the resultant mixture with a composition having the formula

in which R and $R_1$ have the same meaning as before and X is halogen.

2. The method of preparing an α,β-diaryl ethane in accordance with claim 1, in which R is an alkoxyphenyl group.

3. The method of preparing an α,β-diaryl ethane in accordance with claim 1, in which $R_1$ is an alkyl group.

4. The method of preparing a 3,4-di-(p-alkoxyphenyl) hexane, which comprises reacting at a temperature no higher than −10° C. a halide of a metal of the class consisting of iron, cobalt, and nickel and a Grignard reagent of the class consisting of alkyl-magnesium halides and aryl-magnesium halides; adding to the resultant mixture, at a temperature no higher than −10° C., a 1-p-alkoxyphenyl-1-halo propane to form a second mixture; and permitting the temperature of such second mixture to rise gradually.

5. The method of preparing a 3,4-di-(p-alkoxyphenyl) hexane in accordance with claim 4, in which the 1-p-alkoxyphenyl-1-halo propane is a 1-p-methoxyphenyl-1-halo propane.

6. The method of preparing a 1,2-dialkoxyphenyl-1,2-dialkylethane, which comprises reacting a halide of a metal of the class consisting of iron, cobalt, and nickel with a Grignard reagent of the class consisting of alkyl-magnesium halides and aryl-magnesium halides, and reacting the resultant mixture with an alkoxyphenyl-alkyl-halo methane.

7. The method of preparing a 1,2-di-(p-alkoxyphenyl)-1,2-dialkylethane, which comprises reacting a halide of a metal of the class consisting of iron, cobalt, and nickel with a Grignard reagent of the class consisting of alkyl-magnesium halides and aryl-magnesium halides, and reacting the resultant mixture with a p-alkoxyphenyl-alkyl-halo methane.

8. The method of preparing a 3,4-dialkoxyphenylhexane, which comprises reacting a halide of a metal of the class consisting of iron, cobalt, and nickel with a Grignard reagent of the class consisting of alkyl-magnesium halides and aryl-magnesium halides, and reacting the resultant mixture with a 1-alkoxyphenyl-1-halopropane.

9. The method of preparing a 3,4-di-(p-alkoxyphenyl) hexane, which comprises reacting a halide of a metal of the class consisting of iron, cobalt, and nickel with a Grignard reagent of the class consisting of alkyl-magnesium halides and aryl-magnesium halides, and reacting the resultant mixture with a 1-p-alkoxyphenyl-1-halopropane.

10. The method of preparing a 3,4-di-(p-methoxyphenyl) hexane, which comprises reacting a halide of a metal of the class consisting of iron, cobalt, and nickel with a Grignard reagent of the class consisting of alkyl-magnesium halides and aryl-magnesium halides, and reacting the resultant mixture with a 1-p-methoxyphenyl-1-halopropane.

11. The method of preparing a 3,4-di-(p-alkoxyphenyl) hexane in accordance with claim 9, in which the metal halide is a cobalt halide.

12. The method of preparing a 3,4-di-(p-alkoxyphenyl) hexane in accordance with claim 9, in which the metal halide is an iron halide.

13. The method of preparing a 3,4-di-(p-alkoxyphenyl) hexane in accordance with claim 9, in which the metal halide is a nickel halide.

14. The method of preparing a 3,4-dialkoxyphenyl hexane, which comprises reacting a halide of a metal of the class consisting of iron, cobalt, and nickel with a Grignard reagent of the class consisting of alkyl-magnesium halides and aryl-magnesium halides, reacting a 1-alkoxyphenylpropene-1 with a hydrogen halide to form a 1-alkoxyphenyl-1-halopropane, and reacting said 1-alkoxyphenyl-1-halopropane with the mixture resulting from the reaction of said Grignard reagent and metal halide.

15. The method of preparing a 3,4-di-(alkoxyphenyl) hexane, which comprises reacting a halide of a metal of the class consisting of iron, cobalt, and nickel with a Grignard reagent of the class consisting of alkyl-magnesium halides and aryl-magnesium halides, reacting a 1-p-alkoxyphenylpropene-1 with a hydrogen halide to form a 1-p-alkoxyphenyl-1-halopropane, and reacting said 1-p-alkoxyphenyl-1-halopropane with the mixture resulting from the reaction of said Grignard reagent and metal halide.

16. The method of preparing 3,4-di-(p-methoxyphenyl) hexane, which comprises reacting 1-p-methoxyphenylpropene-1 with hydrogen bromide to form 1-p-methoxyphenyl-1-bromopropane and reacting the said 1-p-methoxyphenyl-1-bromopropane with the reaction product of phenylmagnesium bromide and cobaltous chloride.

MORRIS S. KHARASCH.

---

Certificate of Correction

Patent No. 2,392,595.     January 8, 1946.

MORRIS S. KHARASCH

It is hereby certified that errors appear in the printed specification of the above numbered patent requiring correction as follows: Page 3, first column, line 27, for "recation" read *reaction*; line 65, for "3,3-di" read *3,4-di*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*

3. The method of preparing an α,β-diaryl ethane in accordance with claim 1, in which $R_1$ is an alkyl group.

4. The method of preparing a 3,4-di-(p-alkoxyphenyl) hexane, which comprises reacting at a temperature no higher than −10° C. a halide of a metal of the class consisting of iron, cobalt, and nickel and a Grignard reagent of the class consisting of alkyl-magnesium halides and aryl-magnesium halides; adding to the resultant mixture, at a temperature no higher than −10° C., a 1-p-alkoxyphenyl-1-halo propane to form a second mixture; and permitting the temperature of such second mixture to rise gradually.

5. The method of preparing a 3,4-di-(p-alkoxyphenyl) hexane in accordance with claim 4, in which the 1-p-alkoxyphenyl-1-halo propane is a 1-p-methoxyphenyl-1-halo propane.

6. The method of preparing a 1,2-dialkoxyphenyl-1,2-dialkylethane, which comprises reacting a halide of a metal of the class consisting of iron, cobalt, and nickel with a Grignard reagent of the class consisting of alkyl-magnesium halides and aryl-magnesium halides, and reacting the resultant mixture with an alkoxyphenyl-alkyl-halo methane.

7. The method of preparing a 1,2-di-(p-alkoxyphenyl)-1,2-dialkylethane, which comprises reacting a halide of a metal of the class consisting of iron, cobalt, and nickel with a Grignard reagent of the class consisting of alkyl-magnesium halides and aryl-magnesium halides, and reacting the resultant mixture with a p-alkoxyphenyl-alkyl-halo methane.

8. The method of preparing a 3,4-dialkoxyphenylhexane, which comprises reacting a halide of a metal of the class consisting of iron, cobalt, and nickel with a Grignard reagent of the class consisting of alkyl-magnesium halides and aryl-magnesium halides, and reacting the resultant mixture with a 1-alkoxyphenyl-1-halopropane.

9. The method of preparing a 3,4-di-(p-alkoxyphenyl) hexane, which comprises reacting a halide of a metal of the class consisting of iron, cobalt, and nickel with a Grignard reagent of the class consisting of alkyl-magnesium halides and aryl-magnesium halides, and reacting the resultant mixture with a 1-p-alkoxyphenyl-1-halopropane.

10. The method of preparing a 3,4-di-(p-methoxyphenyl) hexane, which comprises reacting a halide of a metal of the class consisting of iron, cobalt, and nickel with a Grignard reagent of the class consisting of alkyl-magnesium halides and aryl-magnesium halides, and reacting the resultant mixture with a 1-p-methoxyphenyl-1-halopropane.

11. The method of preparing a 3,4-di-(p-alkoxyphenyl) hexane in accordance with claim 9, in which the metal halide is a cobalt halide.

12. The method of preparing a 3,4-di-(p-alkoxyphenyl) hexane in accordance with claim 9, in which the metal halide is an iron halide.

13. The method of preparing a 3,4-di-(p-alkoxyphenyl) hexane in accordance with claim 9, in which the metal halide is a nickel halide.

14. The method of preparing a 3,4-dialkoxyphenyl hexane, which comprises reacting a halide of a metal of the class consisting of iron, cobalt, and nickel with a Grignard reagent of the class consisting of alkyl-magnesium halides and aryl-magnesium halides, reacting a 1-alkoxyphenylpropene-1 with a hydrogen halide to form a 1-alkoxyphenyl-1-halopropane, and reacting said 1-alkoxyphenyl-1-halopropane with the mixture resulting from the reaction of said Grignard reagent and metal halide.

15. The method of preparing a 3,4-di-(alkoxyphenyl) hexane, which comprises reacting a halide of a metal of the class consisting of iron, cobalt, and nickel with a Grignard reagent of the class consisting of alkyl-magnesium halides and aryl-magnesium halides, reacting a 1-p-alkoxyphenylpropene-1 with a hydrogen halide to form a 1-p-alkoxyphenyl-1-halopropane, and reacting said 1-p-alkoxyphenyl-1-halopropane with the mixture resulting from the reaction of said Grignard reagent and metal halide.

16. The method of preparing 3,4-di-(p-methoxyphenyl) hexane, which comprises reacting 1-p-methoxyphenylpropene-1 with hydrogen bromide to form 1-p-methoxyphenyl-1-bromopropane and reacting the said 1-p-methoxyphenyl-1-bromopropane with the reaction product of phenylmagnesium bromide and cobaltous chloride.

MORRIS S. KHARASCH.

---

Certificate of Correction

Patent No. 2,392,595.     January 8, 1946.

MORRIS S. KHARASCH

It is hereby certified that errors appear in the printed specification of the above numbered patent requiring correction as follows: Page 3, first column, line 27, for "recation" read *reaction*; line 65, for "3,3-di" read *3,4-di*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*